United States Patent [19]
Betts et al.

[11] Patent Number: 5,230,010
[45] Date of Patent: Jul. 20, 1993

[54] FRACTIONAL RATE MODULATION

[75] Inventors: William L. Betts, St. Petersburg; Gordon F. Bremer, Clearwater, both of Fla.

[73] Assignee: American Telephone & Telegraph Company, New York, N.Y.

[21] Appl. No.: 588,656

[22] Filed: Sep. 26, 1990

[51] Int. Cl.$^5$ .............................................. H04L 5/12
[52] U.S. Cl. .......................................... 375/39; 341/61
[58] Field of Search ................ 375/8, 10, 121, 39; 370/84; 341/61.141

[56] References Cited

U.S. PATENT DOCUMENTS

4,805,167  2/1989  Leslie et al. ............................ 370/84
4,882,726  11/1989  Lang et al. ................................ 375/8
5,008,902  4/1991  Key et al. ............................... 370/84
5,103,227  4/1992  Betts ....................................... 341/61

Primary Examiner—Stephen Chin
Attorney, Agent, or Firm—Kane, Dalsimer, Sullivan, Kurucz, Levy, Eisele and Richard

[57] ABSTRACT

Fractional rate modulation is accomplished by separating incoming data into frames of bits. Each frame is partitioned into bit words of unequal lengths. The words are divided by a modulus to obtain remainders. The remainders are transmitted using for example QAM modulation. At the receiving end the process is reversed. The ratio of the baud rate of the system to the incoming bit rate defines the modulus as well as the number of QAM modulation points.

10 Claims, 7 Drawing Sheets

FRACTIONAL BIT CODING
BITS/BAUD AND MODULUS (NUMBER OF SIGNAL POINTS)

| DATA RATE | BAUD RATE | | | | | | |
|---|---|---|---|---|---|---|---|
| | 2400 | 2743 | 2800 | 2880 | 3086 | 3200 | |
| 24000 | 10  1024 | 35/4  451 | 60/7  381 | 25/3  323 | 70/9  220 | 15/2  182 | |
| 21600 | 9  512 | 63/8  235 | 54/7  211 | 15/2  182 | 7  128 | 27/4  108 | |
| 19200 | 8  256 | 7  128 | 48/7  116 | 20/3  102 | 56/9  75 | 6  64 | |
| 16800 | 7  128 | 49/8  70 | 6  64 | 35/6  58 | 49/9  44 | 21/4  39 | |
| 14400 | 6  64 | 21/4  39 | 36/7  36 | 5  32 | 14/3  26 | 9/2  23 | |
| 12000 | 5  32 | 35/8  21 | 30/7  20 | 25/6  18 | 35/9  15 | 15/4  14 | |
| 9600 | 4  16 | 7/2  12 | 24/7  11 | 10/3  11 | 28/9  9 | 3  8 | |
| 7200 | 3  8 | 21/8  7 | 18/7  6 | 5/2  6 | 7/3  6 | 9/4  5 | |

FRACTIONAL FRAMES

| DATA RATE | 2400 | 2743-8 | 2800-7 | 2880-6 | 3086-9 | 3200-4 |
|---|---|---|---|---|---|---|
| 24000 | 10 | 9 9 9 8 9 9 9 9 | 9 8 9 8 9 8 9 | 9 8 8 9 8 8 | 8 8 8 8 7 8 8 8 7 | 8 7 8 7 |
| 21600 | 9 | 8 8 8 8 8 8 8 7 | 8 8 7 8 8 7 8 | 8 7 8 7 8 7 | 7 7 7 7 7 7 7 7 7 | 7 7 7 6 |
| 19200 | 8 | 7 7 7 7 7 7 7 7 | 7 7 7 7 7 7 7 | 7 7 6 7 7 6 | 7 6 6 6 7 6 6 6 6 | 6 6 6 6 |
| 16800 | 7 | 7 6 6 6 6 6 6 6 | 6 6 6 6 6 6 6 | 6 6 6 6 6 6 | 6 5 6 5 6 5 6 5 5 | 6 5 5 5 |
| 14400 | 6 | 6 5 5 5 6 5 5 5 | 6 5 5 5 5 5 5 | 5 5 5 5 5 5 | 5 4 5 5 4 5 5 4 5 | 5 4 5 4 |
| 12000 | 5 | 5 4 4 5 4 5 4 5 | 4 5 4 4 5 4 4 | 5 4 4 4 4 4 | 4 4 4 4 4 4 4 4 4 | 4 4 4 3 |
| 9600 | 4 | 4 3 4 3 4 3 4 3 | 4 3 4 3 4 3 4 | 4 3 5 4 3 3 | 4 3 3 3 4 3 3 3 3 | 3 3 3 3 |
| 7200 | 3 | 3 3 2 3 2 3 2 3 | 3 2 3 2 3 2 3 | 3 2 3 2 3 2 | 3 2 2 3 2 2 3 2 2 | 3 2 2 2 |

FRACTIONAL RATE MODULATION

RELATED APPLICATION

The subject matter of this application is related to the subject matter of U.S. Pat. No. 5,103,227, filed on even date herewith and entitled MODULUS CONVERTER FOR FRACTIONAL RATE ENCODING.

BACKGROUND OF THE INVENTION

A. Field of Invention

This invention pertains to a method and apparatus useful for data transmission using quadrature amplitude modulation, and more particularly, to a method and apparatus which may be optimized to a particular communication channel by using fractional rate modulation.

B. Description of the Prior Art

It is well known in the art of signal communications that the optimum performance of a communication channel is achieved when the date rate of the channel is equal to $B \times \log_2 S/N$ where S/N is the signal-to-noise ratio and B is the bandwidth. However data communication systems are also constrained by a number of other parameters which make it very difficult to operate at the idealized bandwidth described above. For example, data communication systems using quadrature amplitude modulation (QAM) are constrained by standardized data rates, power levels and bit rates, to a ratio of the bits/baud having to be an integer. As a result, in general the data rate of a QAM system is usually lower than the channel capacity.

Other methods of fractional rate encoding are known. These include multi-dimension trellis codes and a simple encoded method identified in the reference below. See for example, Forney et al.: Efficient Modulation for Band-Limited Channels, IEEE Journal on Selected Areas in Communications, Vol. SAC-2, No. 5, Sept. 1984 pg. 637. Lee-Fang Wei: Trellis-Coded Modulation with Multidimensional Constellations, IEEE Transactions on Information Theory, Vol. IT-33, No. 4, July 1987 pp. 483-501. These methods are not generally applicable at all rates. They require a block encoder to partition "inner" and "outer" sets of points for selective transmission in one or more bauds of a larger block or frame. A unique encoder is required for each combination of bit rate and baud rate.

The present invention is generally applicable to any bit rate and baud rate combination. The baud rate is chosen to match the optimum bandwidth of the channel. A modulus, m, is computed from the smallest integer:

m ≧ 2(bit rate/baud rate)

Data is encoded for transmission using a signal constellation with m points. Each point in the constellation is identified by a unique integer index in the range 0 to m−1.

A frame length is selected by reducing the ratio of bit rate/baud rate to the lowest common denominator. The numerator identifies the number of bits in a frame and the denominator identifies the number of bauds in a frame, F. A modulus converter is used to convert the bits to F words of modulus m. Each word is used a the index to select the respective unique point in the constellation for transmission.

OBJECTIVES AND SUMMARY OF THE INVENTION

An objective of the present invention is to provide a method and apparatus for data communication wherein the data communication is optimized by selecting a baud rate equal to the ideal bandwidth.

A further objective is to provide a method and apparatus for data communication having a baud rate which is nearly independent of the data rate.

Yet a further objective is to provide a data communication system which includes a data error correction scheme which is also independent of the data rate.

Other objectives and advantage of the invention shall become apparent from the following description of the invention. In a data communication apparatus constructed in accordance with this invention a baud rate is selected to insure optimum performance based on the characteristics of the data channel used for the data transmission. Fractional data rate modulation is then used (if advantageous) to transmit data at the selected baud rate. For example, assume that a particular channel has an optimum bandwidth corresponding to 3000 baud, and it is desired to transmit data at a rate of 19,200 bits/sec or 6.4 bit/baud. According to standard QAM techniques this may be accomplished by converting the incoming binary bits into words in base 85. Conventional QAM could not operate at 3000 baud. Instead conventional QAM must operate at 2743 baud using 128 points or 2400 baud using 256 points. The present invention uses the optimum bandwidth and fewer signal points for better performance. This invention allows transmitting this data rate at 3000 baud by QAM using a signal space of a minimum of $2^{6.4} = 84.45 \approx 85$ points.

The fractional rate, such as 6.4 is converted into a ratio of two integers such as 32/5. The incoming bit stream is then partitioned into frames of 32 bits each. Each frame is further partitioned into five words, with two of the words containing seven bits and the remaining three words containing six bits each. These words are then converted into words in base 85 which each word of a frame being considered as a digit. It was found that this technique can be readily implemented using microprocessor based modem.

After the base conversion, the outgoing data signals are further processed to provide forward error correction in accordance for example with CCITT V. 33. This processing adds one bit per baud thereby doubling the number of points required in the signal constellation. Moreover, at the receiving end the process is reversed to reconstruct the original bit stream. In this manner an arbitrary input data rate is transmitted at the optimum baud rate of the channel.

DETAILED DESCRIPTION OF THE INVENTION

Figure 1:
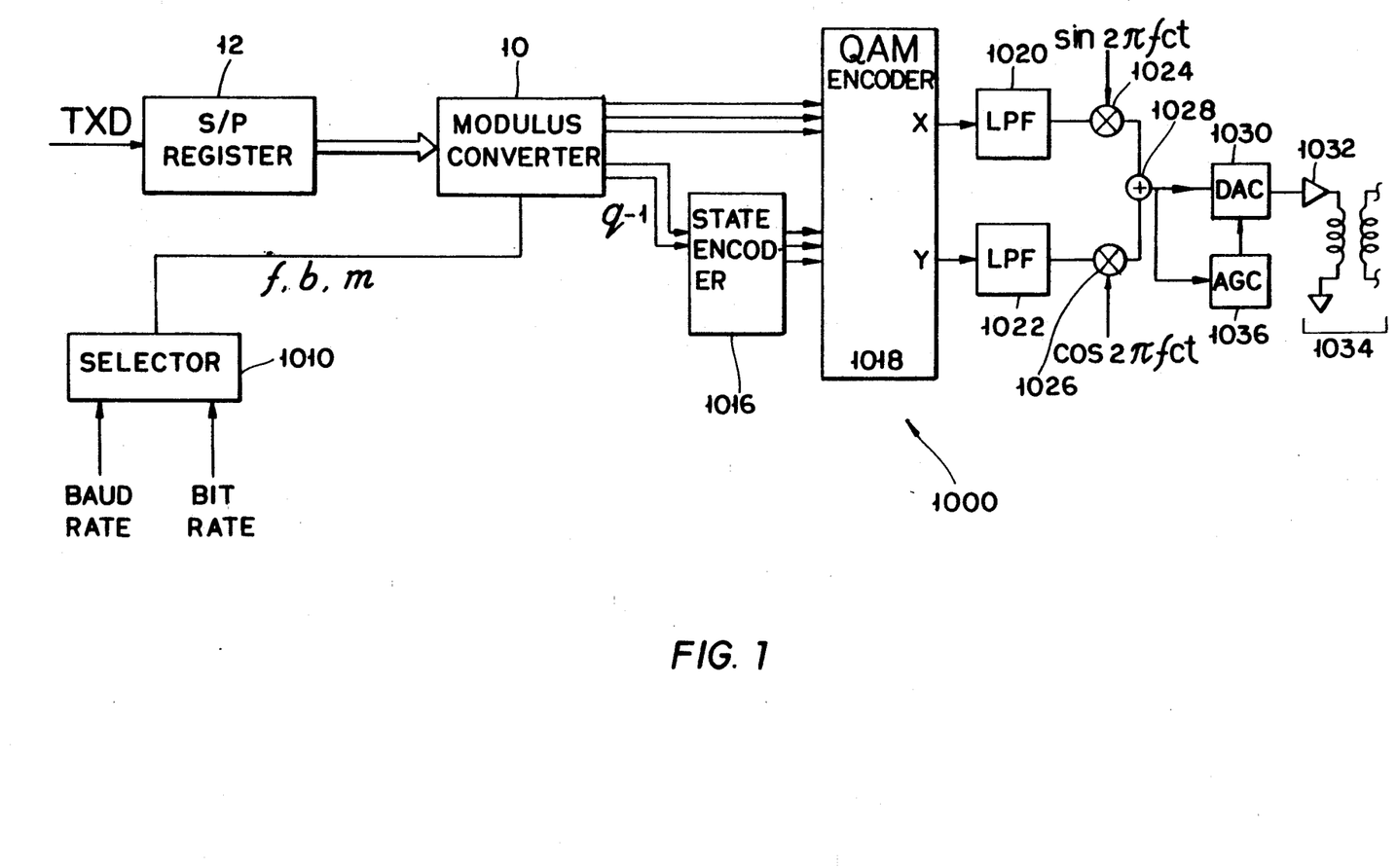
FIG. 1 shows a schematic diagram for a transmitter for optimal data transmission using fractional rate modulation in accordance with this invention.

Referring now to the Figures, FIG. 1 shows the transmitter section 1000 of a modem constructed for optimum data transmission. The section includes a modulus converter 10 described in more detail below, which receives data bits in parallel from a serial-to-parallel data converter 12. The modem also includes a selector 1010 which is activated by two signals: the baud rate signal which defines the baud rate of the particular channel to be used by the modem and the bit rate of the incoming data TXD. Based on these signals the selectors generates the parameters f, b, and m required for the modulus converter 10.

Trellis encoding is not required, however if it is used, two or more bits from the output of the serial-to-parallel register 12 are fed to a state encoder 1016 which uses for example a Viterbi encoding scheme as defined by a trellis encoder such as the CCITT V.33 standard to generate three encoded bits. The three encoded bits contain redundant information for forward error correction coding. The bits generated by state encoder 1016, as well as the remaining bits from converter 10 are all fed in parallel to a standard QAM encoder 1018 which may be for example a look-up table or a RAM. The QAM encoder 1018 in response generates two orthogonal signals X and Y which define uniquely one of the points of a preselected signal constellation. The signals X and Y are fed to two low pass filters 1020, 1022. The filtered signals are then multiplied in multipliers 1024, 1026 with two orthogonal sinusoidal signals at the carrier frequency $f_c$. The outputs of the multipliers are added by summer 1028. Since the operations described so far are performed preferably using digital circuitry, the output of summer 1028 are converted by a digital-to-analog converter (DAC) 1030. This analog signal is amplified by amplifier 1032 and then transmitted over a channel 1034. The amplitude of the signal transmitted over channel 1034 is regulated by an AGC circuit 1036.

Figure 2:
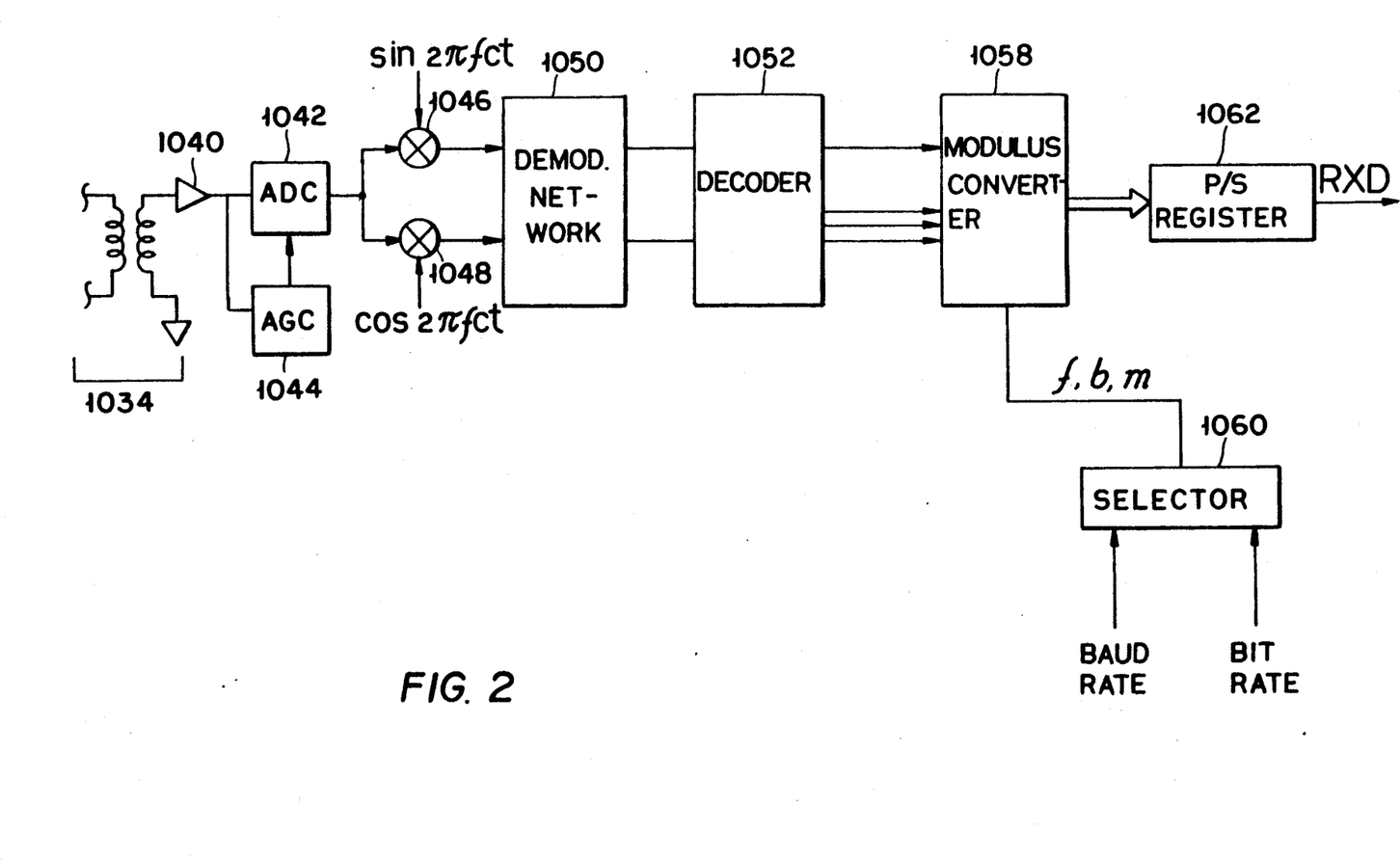
FIG. 2 shows a schematic diagram for a receiver matching the transmitter of FIG. 1.

At the receiver end 1038, the signal from channel 1034 is fed to an amplifier 1040. The analog amplified signal from amplifier 1040 is converted to a digital signal by an analog-to-digital converter 1042. The operation of converter 1042 is regulated through an automatic gain control (AGC) circuit 1044. The output of the converter is fed in parallel to two multipliers 1046, 1048 for multiplication with the two orthogonal signals as shown to obtain the two coordinates X and Y of the received signal points. These two coordinates are sent to a demodulating network 1050 which performs signal equalization, phase tracking, Viterbi decoding and other similar functions required for standard QAM data transmission. The signals from the network 1050 are then decoded by decoder 1052. If trellis encoding is used, then the decoder restores the two or more trellis encoded bits which are routed directly to the parallel-to-serial register 1062. The remaining bits are then transmitted to a modulus converter 1058 for converting them back to the arithmetic base originally sent. The parameters for converter 1058 are generated by a selector 1060 similar to selector 1010. Finally the parallel output of converter 1058 is transformed into a serial bit stream RXD by a parallel/serial register 1062.

Figure 3:
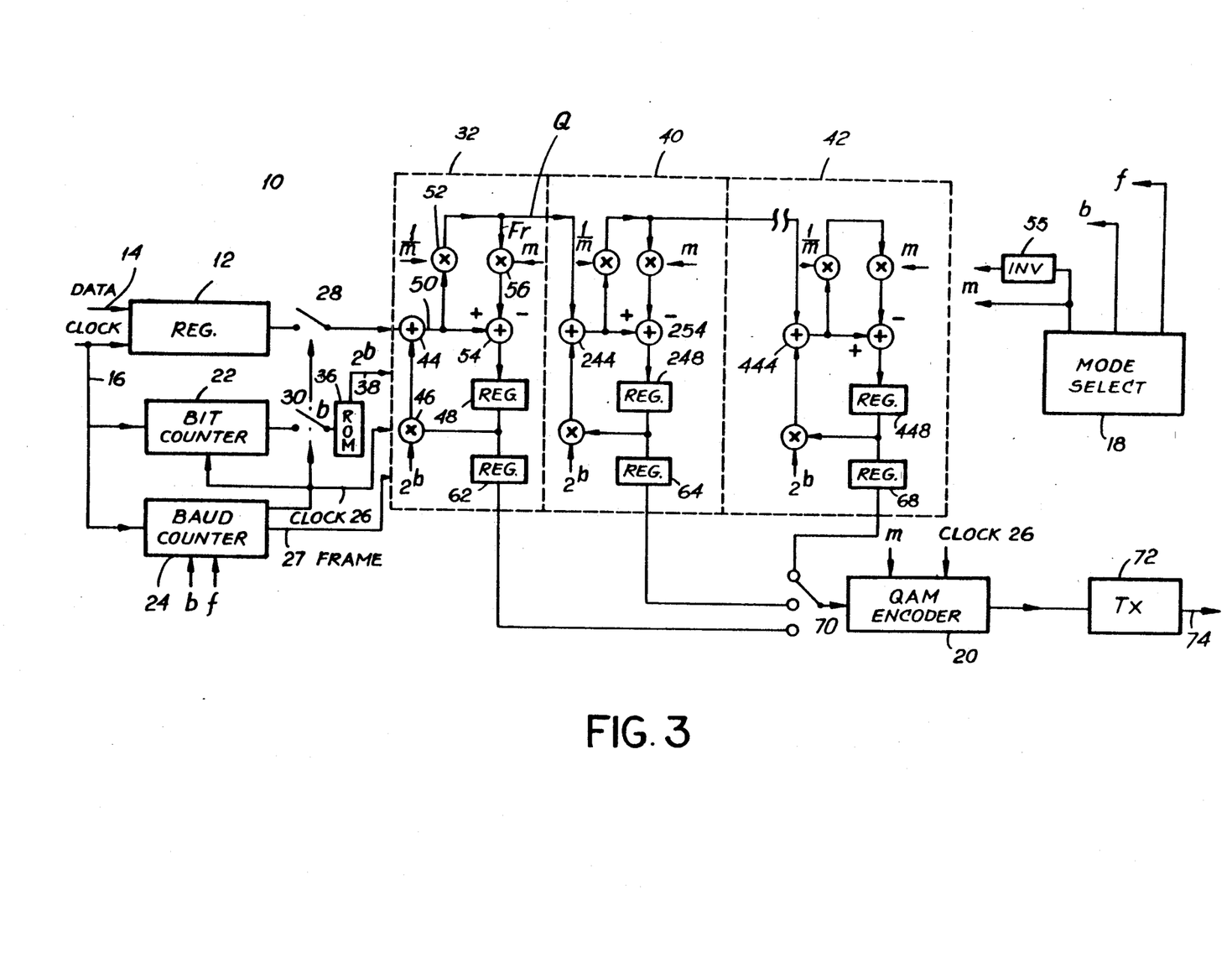
FIG. 3 shows details of the modulus converter for the transmitter of FIG. 1.
Figure 6:
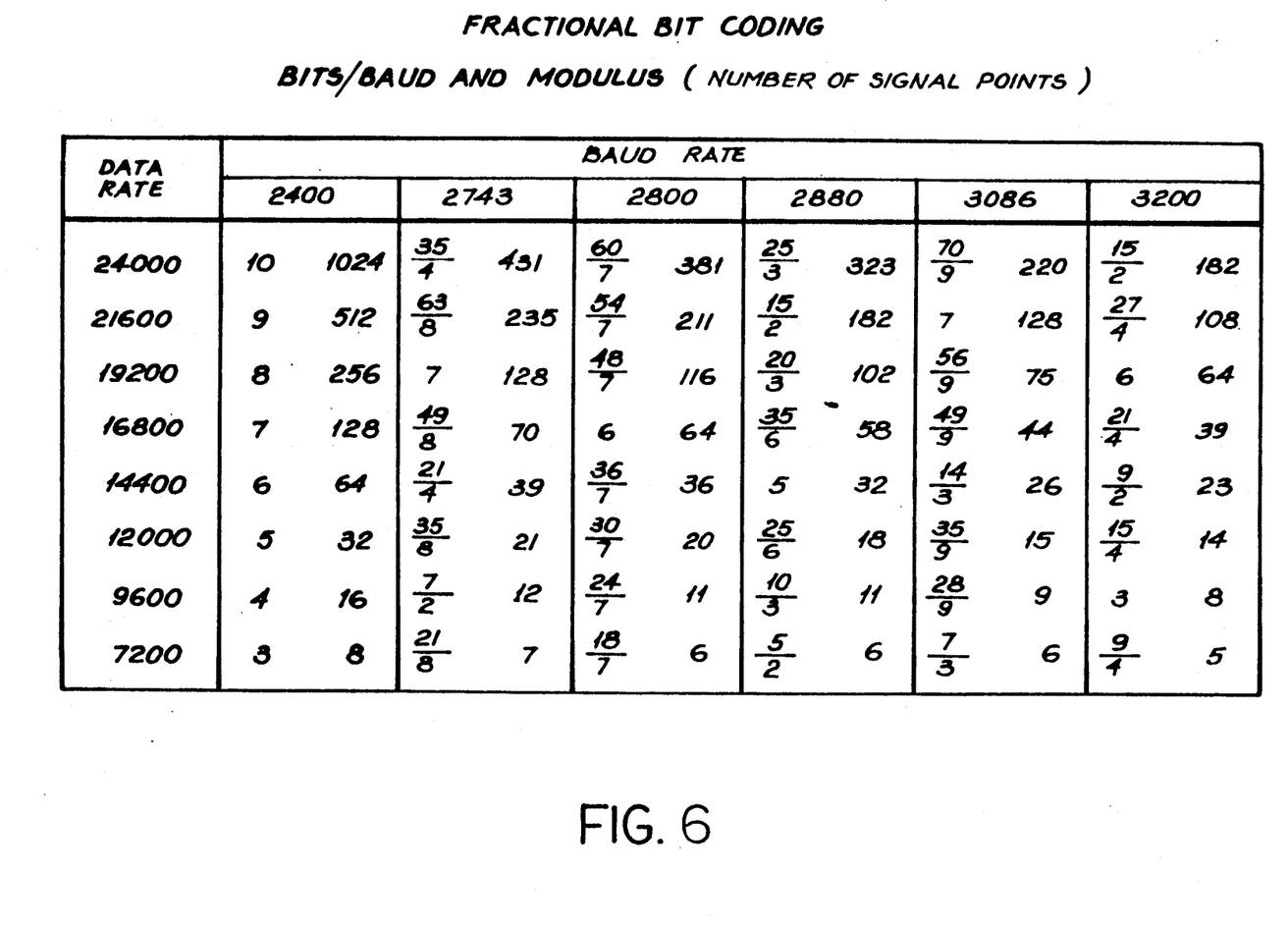
FIG. 6 shows a table indicating the fractional data rate and the corresponding number of signal points for various input data rates and baud rates.
Figure 7:
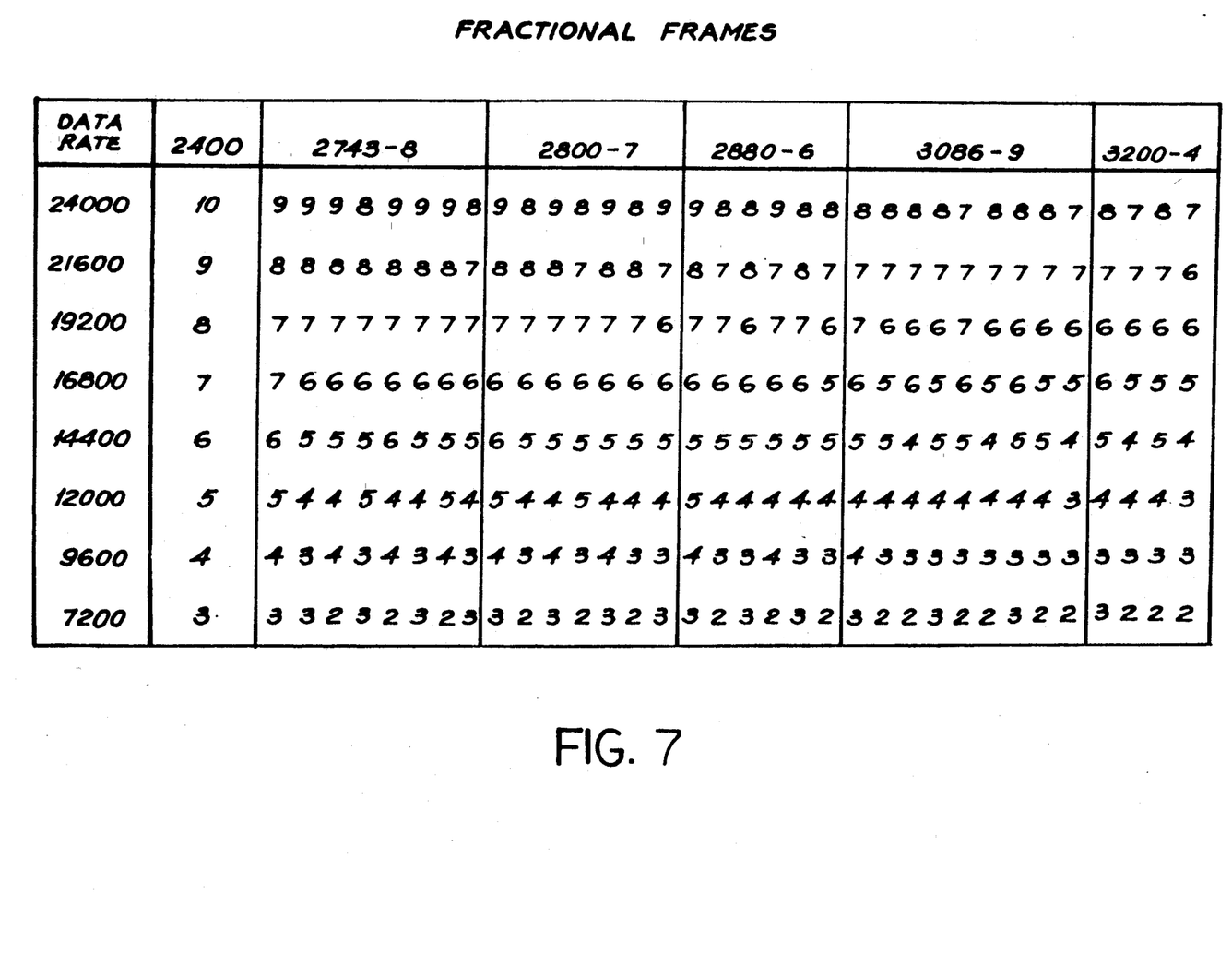
FIG. 7 shows how an incoming data bit stream is partitioned into frames of various lengths for various baud rates.

Details of a circuit used for modulus conversion are shown in FIG. 3 which is also disclosed in the above mentioned application entitled MODULUS CONVERTER FOR FRACTIONAL RATE ENCODING. The circuit 10 includes a serial in-parallel, out shift register 12 for receiving data bits on line 14, under the control of clock pulses on line 16. A mode selector 18 is used to set up the circuit to convert the data bits in accordance to the bit rate received on line 14 and the baud rate of the particular channel used. Based on these parameters, the mode selector generated three control parameters for the modula, i.e. m, the number of signal points required by a QAM encoder 20 to transmit the data signals; b, the number of bits per each word: and f, the number of words per frame, as defined in FIGS. 6 and 7. The parameters, m and f, are constant for a given pair of baud and bit rates. The parameter b changes as shown in FIG. 7. For example, for a 24000 bit/sec, 3200 baud transmission, m =182, f=4 and b=7 or 8.

The clock pulses on line 16 are used by a bit counter 22 and a baud counter 24. For the example given above (i.e. 24000 bit/sec 3200 baud) initially, b may be equal to 8.

While the data bits are entered serially into register 12, counter 22 counts the bits contained therein. Baud counter 24 keeps track of the number of bits received and when this number equals b, the baud counter generates an enabling signal on line 26. Register 12 has an output port illustrated in FIG. 3 symbolically as a switch 28. Similarly, counter 22 has an output port symbolized by a switch 30. In response to the enabling signal on line 26, switch 28 transfers in parallel the b bits found in register 12 to a remainder cell 32. Similarly, in response to the enabling pulse on line 26, switch 30 also transmits count b from counter 22 to a look-up table such as a ROM 36. In response ROM 36 generates a binary signal equal to $2^b$ on line 38. This $2^b$ is the modulus or base of the input data word in register 12. Finally, the signal on line 26 is also used as a clock signal to clock the various elements of the remainder cell 32, as well as, the other remainder cells described more fully below.

Remainder cell 32, as well as the other remainder cells such as cells 40 and 42 are used to calculate the remainder in modulus m for the f bauds in a frame. More particularly, each remainder cell calculates the remainder for one of the bauds, with the higher remainder cells also taking into account the integer portion of the quotient generated by the previous cells. Thus, the number of remainder cells required for a conversion is equal to f. In FIG. 3, the first cell 32, second cell 40, and last or most significant digit cell 42 are shown. Since all the cells are identical, the cell between cells 40 and 42 (and more intermediate cells for converters with more bauds per frame) are not shown for the sake of simplicity.

For a first word $X_0$, in remainder cell 32, the bits from register 12 for a first word $X_0$ are first entered into an adder 44. Adder 44 receives a second input from a multiplier 46. Multiplier 46 multiplies the outputs of register 48 and ROM 36. Since at the end of each frame, the clear signal on line 27 clears register 48, for the first byte in register 12, the output of multiplier 46 is 0. The output of adder 44 is entered on line 50 to a multiplier 52 and an adder 54. An invertor 55 is used to invert the parameter m from mode selector 18 thereby generating a parameter 1/m described in more detail below. Multiplier 52 in effect divides the output of adder 44 by m and generates a quotient which has two components: an integer component Q and a fractional component Fr. Instead of this scheme, a true division may also be performed. However, multiplication by the inverse because it is easier and cheaper to implement is preferable. Fractional component Fr is truncated to zero. The integer component Q is multiplied in multiplier 56 by m to scale it back to the magnitude before the operation of multiplier 52. The output of multiplier 56 is fed to adder 54 which subtracts it from the output of adder 44 on line 50. The output of adder 54 is the remainder of first word $X_0$ from register 12 when divided by m. This remainder is stored in register 48 as a remainder R0. The remainder is always less than m. The quotient Q passes through adders 244 and 254 of remainder cell 40 and is stored in register 248 as a remainder R1.

If a multiplication by the inverse 1/m rather than a true division is performed, a quantizing error is introduced into the process. A check may be performed at the end of each initiation to insure that as a result of this quantizing error, the output of adder 54 is not too large. For example, the output of adder 54 may be compared to m. An output bigger than m is unacceptable. This error may be corrected by subtracting m from the output of adder 54 (several times if necessary) until the adder 54 is reduced below m. For each correction the integer component Q on line Q must be increased by one.

For the next word $X_1$, a similar iteration occurs two exceptions: since new byte $X_1$ has only 7 bits, b now is changed to 7 in accordance with the arrangement of bits shown in FIG. 7, and adder 44 adds $R_1 * 2^b$ to $X_1$. The rest of the remainder cells operate on this new sum as described above. The multiplier is important because it allows successive words of various bits in size to be successively converted. Conventional modulus or base conversion would require all bits in a frame to be held in a single large register with increased complexity. After four iterations, during which each of the cells is progressively brought into play, the registers in the remainder cells contain the remainders required to uniquely define f bauds from register 12 in modula m. The intermediate results of the iterations and the final contents of the registers 48, 248, 448 are shown in table I below:

In the next four baud periods (for f=4) the remainder cells convert the next four bauds as described above. Meanwhile multiplexer switch 70 samples each of the storage registers 62, 64, . . 68, starting with the most significant baud found in storage register 68. The remainders stored therein are then sequentially transferred by switch 70 to QAM encoder 20. The QAM encoder also receives the modulus m from mode selector 18. The switch 70 may be stepped from one storage register to another by the clock pulses on line 26. The same clock pulses may also be used by the encoder 20 to generate the proper QAM signals. The QAM encoder generates a QAM signal constellation of m points. All remainders are limited to values between 0 and m−1. As a result the last remainder cell 42 has an zero integer component Q, and overflow or non-zero Q is prevented. The modulus m is chosen to be the smallest integer greater than $2^c$ where c=bit rate/baud rate. Since $m^f \cong 2^{(b0=b1=b2=b3)}$ thus, the modulus is chosen such that overflow can not occur. The bit rate is achieved with the smallest possible signal constellation or modulus.

The output of encoder 20 is fed to transmitter circuitry 7 which generates corresponding analog signals for transmission over a channel 74.

Figure 4:
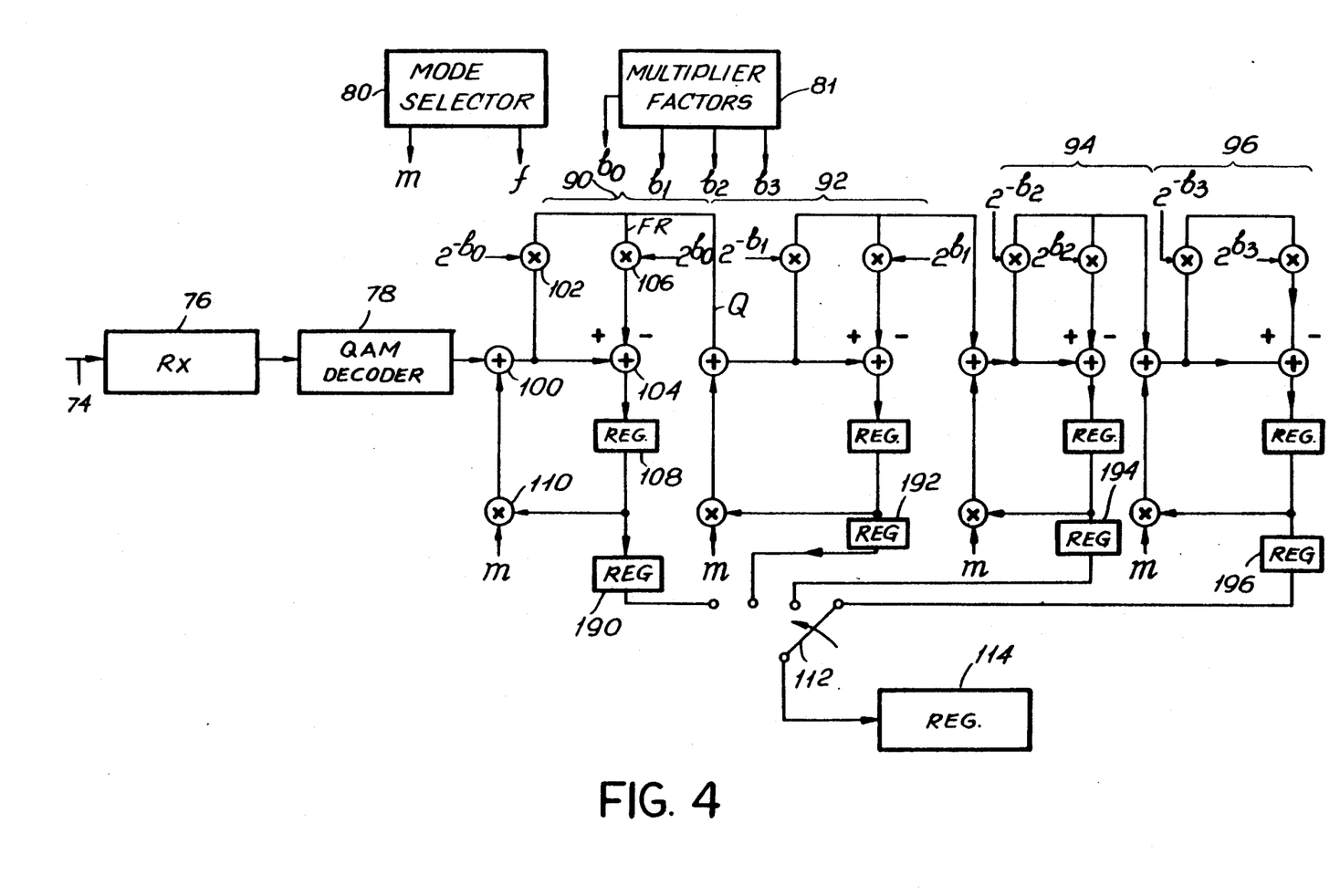
FIG. 4 shows details of the modulus converter for the receiver of FIG. 2.

At the receiver end, as shown in FIG. 4, analog signals from channel 74 are converted into digital signals by receiver circuitry 76. These digital signals are fed to QAM decoder 78. At the receiver end there is also mode selector 80 which is used to generate the parameters m and f in a manner identical to mode selector 18. Multipliers $b_0$, $b_1$, $b_2$, $b_3$ and their inverses are stored in a register 81. Alternatively, the inverses of these parameters are calculated as described more fully above. Again, the number of remainder circuits is equal to the number of words per frame f. The remainder circuits are used to convert the fractionally encoded signals into standard binary signals. In remainder circuit 90, the bits corresponding to the first received baud from a given frame are fed to an adder 100. The output of adder 100 is fed to a multiplier 102 and another adder 104. Multiplier 102 divides its input by $2^{b0}$ to generate a truncated integer Q described above. The integer Q is fed into a second multiplier 106 which multiplies by $2^{b0}$. The output is subtracted from the output of adder 100 by adder 104 to generate a first remainder. This first remainder is stored in register 108. The quotient Q is processed by

TABLE I

| BAUD | INPUT | $R_0$ | $R_1$ | $R_2$ | $R_3$ |
|---|---|---|---|---|---|
| 0 | $X_0$ | $R_0 = \text{rem } X_0$ | $R_1 = \text{mod } X_0$ | | |
| 1 | $X_1$ | $R'_0 = 2^b R_0 + X_1$ | $R'_1 = 2^b R_1 + \text{mod } R'_0$ | $R_2 = \text{mod } R'_1$ | |
| | | $R_0 = \text{rem } R'_0$ | $R_1 = \text{rem } R'_1$ | | |
| 2 | $X_2$ | $R'_0 = 2^b R_0 + X_2$ | $R'_1 = 2^b R_1 + \text{mod } R'_0$ | $R'_2 = 2^b R_2 + \text{mod } R'_1$ | $R_3 = \text{mod } R'_2$ |
| | | $R_0 = \text{rem } R'_0$ | $R_1 = \text{rem } R'_1$ | $R_2 = \text{rem } R'_2$ | |
| 3 | $X_3$ | $R'_0 = 2^b R_0 + X_3$ | $R'_1 = 2^b R_1 + \text{mod } R'_0$ | $R'_2 = 2^b R_2 + \text{mod } R'_1$ | $R'_3 = 2^b R_3 + \text{mod } R'_2$ |
| | | $R_0 = \text{rem } R'_0$ | $R_1 = \text{rem } R'_1$ | $R_2 = \text{rem } R'_2$ | $R_3 = \text{rem } R'_3$ |

In this table the $R'_i$ indicates the output of the initial adder of the i-th cell. Thus when second word $X_1$ is read into the first remainder cell 32, intermediate parameter $R'_0$ is given by $$R'_0 = 2^b R_0 = X_1.$$

After the remainders for all the bytes of a frame have been generated, baud counter 24 generates a pulse on line 27 which as previously mentioned, clears the registers 48, 248, 448 of each remainder cells. However, the information from these registers is transferred before clearing to respective storage registers 62, 64, 68.

the next remainder circuit 92.

In the next baud period, multiplier 110 multiplies the output remainder in register 108 by m and the product is added to the bits corresponding to the next baud from QAM decoder 78 by adder 100. The whole process is then repeated. At the end of the frame, the buffer registers of the remainder circuits 90, 92, 94, 96 contain the remainders which are saved in buffer register 190, 192, 194, 196 and multiplexed by a switch 112, starting with the output of the last remainder circuit 96. The binary signals from switch 112 are then fed to a register 114 for further processing.

Operation of the receiver remainder circuits is identical to the transmitter except the multiplier coefficients are changed. These coefficients are generally pre-computed. The inverse, for example, depends on the register size used in the converter. For 16 bit registers the inverse is computed as 65536/m or $(1/m)(2^{16})$. The division is then accomplished by keeping only the most significant 15 bits of the 31 bit product of two 16 bit 2's compliment numbers. This is effectively a right shift of 16 bits or division by 65536. Note that $2^{-16} = 1/65536$.

In the receiver the remainder circuits are restoring the original binary words with integer numbers of bits as they were received in register 12 at the transmitter. Thus, the multipliers $2^{-bi}$ and $2^{bi}$ in the receiver can be accomplished by shift operations.

Table II illustrates typical coefficients for 3200 bauds using 16 bit registers selected in accordance with the principles set forth above.

Fractional rate modulation will allow a designer to build a data transmission device to operate in any bandwidth and at any data rate. For most channels, the bandwidth is obvious because of filters known to be used in the channel circuitry. For example, PCM channel filters used in the common D4 channel bank reject signal frequencies below 100HZ or above 3700HZ. Submarine cable channels reject signal frequencies below 200HZ or above 3000HZ. The channel bandwidth is determined by taking the difference between the upper and lower band limits giving 3600HZ or 2800HZ respectively. The carrier frequency for QAM modulation is the average of the upper and lower band limits giving 1900HZ or 1600HZ respectively.

For fractional rate modulation the baud rate is set equal to the channel bandwidth. The highest possible baud rate is desirable to improve signal-to-noise ratios and to reduce throughput delay.

Figure 5:
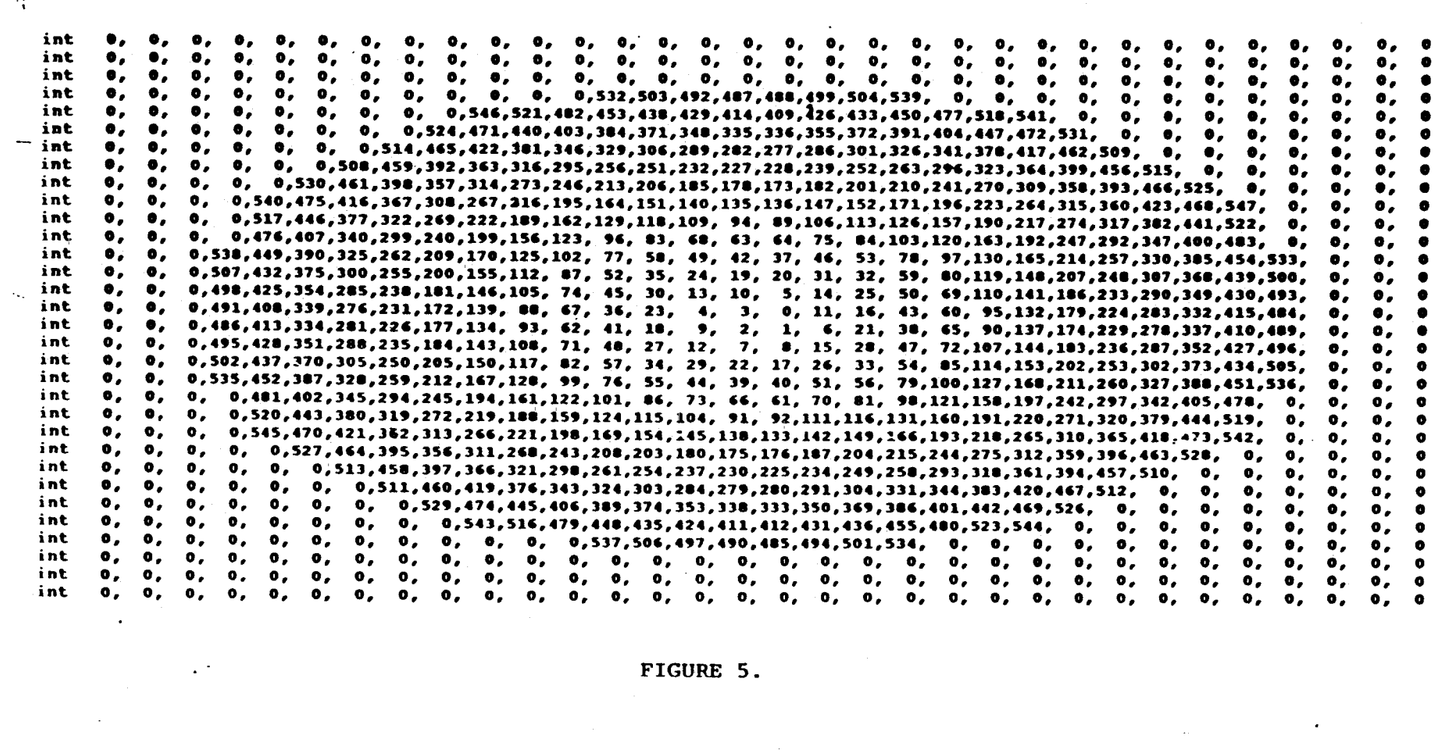
FIGS. 5 shows a signal constellation for transmitting data in accordance with this invention.

A computer look-up table (which may be part of the QAM encoder 1018) can be used to encode and decode the fractional rate modulated signal points. FIG. 5 identifies up to 548 signal points, point 0 being at the center of the constellation corresponding to the x=1, y=1 coordinates of a signal constellation point. Value 547 is on the perimeter on the right side of the constellation corresponding to the x=23, y=13 coordinates.

The computer table can be used for uncoded modulation with modulus as large as 548. The same constellation can be used for 4 dimensional (4D) trellis coding with modulus as large as 137. The two least significant bits of each index correspond to a phase rotation as directed by a trellis encoder. The remaining bits identify the modulus converted index. For example, table values of 16, 17, 18, 19 correspond to signal points (5,1), (1,−5), (−5,−1), and −1,5) respectively. With 4D trellis coding, these points all correspond to the same modulus converted index 4, but different trellis encoded rotation bits of 0, 1, 2, or 3. The constellation may be increased to cover more values as required.

It should be understood that the apparatus is preferably implemented by using a microprocessor rather than using discrete components, for example by using the software program written in the appendix and attached hereto.

Obviously numerous modifications can be made to the invention without departing from its scope as defined in the appended claims.

TABLE II

EXAMPLE OF PRE-COMPUTED COEFFICIENTS FOR ALL DATA RATES AT 3200 BAUD USING 16 BIT REGISTERS

| Data Rate | C | m | 1/m | $2^{b_3}$ | $2^{-b_3}$ | $2^{b_2}$ | $2^{-b_2}$ | $2^{b_1}$ | $2^{-b_1}$ | $2^{b_0}$ | $2^{-b_0}$ |
|---|---|---|---|---|---|---|---|---|---|---|---|
| 24000 | 15/2 | 182 | 360 | 256 | 256 | 128 | 512 | 256 | 256 | 128 | 512 |
| 21600 | 27/4 | 108 | 606 | 128 | 512 | 128 | 512 | 128 | 512 | 64 | 1024 |
| 19200 | 6 | 64 | 1024 | 64 | 1024 | 64 | 1024 | 64 | 1024 | 64 | 1024 |
| 16800 | 21/4 | 39 | 1680 | 64 | 1024 | 32 | 2048 | 32 | 2048 | 32 | 2048 |
| 14400 | 9/2 | 23 | 2849 | 32 | 2048 | 16 | 4096 | 32 | 2048 | 16 | 4096 |
| 12000 | 15/4 | 14 | 4681 | 16 | 4096 | 16 | 4096 | 16 | 4096 | 8 | 8192 |
| 9600 | 3 | 8 | 8192 | 8 | 8192 | 8 | 8192 | 8 | 8192 | 8 | 8192 |
| 7200 | 9/4 | 5 | 13107 | 8 | 8192 | 4 | 16384 | 4 | 16384 | 4 | 16384 | m = smallest integer $\geq 2^c$
1/m = $2^{16}/m$

APPENDIX

```
                                    /* MODULUS8.C  */ int m,modulus[4],inverse[4],word,i,rem[5];
                       /* For modulus[m] and inverse[m] use:  */
                       /*     m=0 for output bauds            */
                       /*     m=1 for word1                   */
                       /*     m=2 for word2                   */
                       /*     m=3 for word3                   */
#include <stdio.h>
#include <math.h>
void main()
{
        void modconv();
        int baud[5],error_test;
        long longreg;
        float bits;
        printf("\n This program converts 3 words of different modulus   ");
```

```c
        printf("\n to 4 baud symbols of common modulus for modulation.  ");
        printf("\n The modulus must not exceed 32767.");
        m=0;
                printf("\n Type the common modulus: ");
                scanf ("%i",&modulus[m]);
                inverse[m]=(long)65536/(long)modulus[m];
                bits=0;
        for(m=1;m<=3;++m) {
                printf("\n Type the modulus for word%i = ",m);
                scanf ("%i",&modulus[m]);
                inverse[m]=(long)65536/(long)modulus[m];
                bits=bits+log(modulus[m])/log(2);
        };
        error_test=pow(2.,bits/4)+.99999;
        if(modulus[0]<error_test) {
                modulus[0]=error_test;
                inverse[0]=(long)65536/(long)modulus[0];
                printf("\n The common modulus must be %i.",modulus[0]);
        };
        printf("\n This section converts 3 words to the common modulus.");
word1:
        m=1;
        printf("\n\n Type the most significant word, word%i: ",m);
        scanf ("%i",&word);
        if(word>=modulus[m]) {
                printf(" Error:  word exceeds %i",modulus[m]-1);
                goto word1;
        }
        i=1;
                rem[i]=0;       /* Initialize rem[i].              */
                modconv(m,0);   /* Convert word,modulus[m],        */
        i=2;
                                /* to rem[i],modulus[0].           */
                rem[i]=word;    /* The carry output is in "word".  */ word2:
        m=2;
        printf("\n\n Type the next word, word%i:",m);
        scanf ("%i",&word);
        if(word>=modulus[m]) {
                printf(" Error:  word exceeds %i",modulus[m]-1);
                goto word2;
        }
        i=1;                    /* Convert word,modulus[m],        */
                modconv(m,0);   /* to rem[i],modulus[0].           */
        i=2;
                modconv(m,0);   /* Convert carry "word" to rem[i]. */
        i=3;
                rem[i]=word;    /* Store the last carry output in rem[i]. */ word3:
        m=3;
        printf("\n\n Type the least significant word, word%i: ",m);
        scanf ("%i",&word);
        if(word>=modulus[m]) {
                printf(" Error:  word exceeds %i",modulus[m]-1);
                goto word3;
        }
        i=1;
                modconv(m,0);
                baud[4]=rem[i];
        i=2;
                modconv(m,0);
                baud[3]=rem[i];
        i=3;
                modconv(m,0);
                baud[2]=rem[i];
        i=4;
                rem[i]=word;
                baud[1]=rem[i];
```

```
        printf("\n\n The 4 baud symbols are: %i,%i,%i, and %i. \n",
              rem[4],rem[3],rem[2],rem[1]);

/* DECODE ORIGINAL WORDS */
baud1:
        i=1;
                rem[i]=baud[1]; /* Initialize rem[i]=baud[1]. */
baud2:
        i=1;
                word=baud[2];   /* Convert baud[2],modulus[0] */
                modconv(0,4-i); /* to rem[i],modulus[4-i]     */
        i=2;
                rem[i]=word;    /* Store the carry for the next baud. */
baud3:
        i=1;
                word=baud[3];
                modconv(0,4-i);
        i=2;
                modconv(0,4-i);
        i=3;
                rem[i]=word;
baud4:
        i=1;
                word=baud[4];
                modconv(0,4-i);
        i=2;
                modconv(0,4-i);
        i=3;
                modconv(0,4-i);
        printf("\n Decoded words are: %i,%i,& %i \n",
               rem[3],rem[2],rem[1]);

/* MODULUS CONVERTER SUBROUTINE */

/* Convert word,modulus[m_in] to rem[i],modulus[m_out]. */
        /* Replace "word" with carry output for next conversion. */ void modconv(int m_in,int m_out)
{
        long longreg;
        longreg=(long)word+(long)modulus[m_in]*(long)rem[i];
        word=longreg*inverse[m_out]>>16;
        longreg=longreg-(long)word*(long)modulus[m_out];
loop:   if(longreg>=modulus[m_out]) {   /* Test corrects quantization error */
                longreg=longreg-modulus[m_out];
                word=word+1;
                goto loop;      /* Loop is required for modulus above 271. */
        }                       /* Cycles < modulus[m_in]*modulus[m_out]/65536 */
        rem[i]=longreg;
};
```

50

We claim:

1. A fractional rate data communication system comprising:

a. data transmitting means including partitioning means for partitioning incoming data into frames of equal number of bits, each frame being further partitioned into at least two words of unequal number of bits, and a plurality of transmit remainder calculating means for generating transmit remainders corresponding to said words based on a preselected modulus, said preselected modulus being denominated as m, and encoding means for encoding said transmit remainders into bauds for transmission on a data channel; and b. data receiving means for receiving said bauds from said data channel and including decoding means for decoding said bauds into receive remainders, and a plurality of receive remainder circuits for converting said receive remainders into received data using a modulus m conversion.

2. The system of claim 1 wherein said encoding means includes a quadrature amplitude modulation encoder.

3. The system of claim 1 wherein said data decoding means includes a quadrative amplitude modulation decoder.

4. The system of claim 2 wherein said encoding means transmits bauds defined by a preselected number of signal points ona signal constellation, and wherein said modulus m is equal the number of signal points.

5. The system of claim 4 wherein the number of bits per frame divided by the number of words per frame defines a fraction which is equal to the incoming data rate divided by the baud rate of said encoder.

6. A data communication system for transmitting binary data at a preselected bit rate over a channel at a predetermined baud rate wherein the ratio of the bit-to-baud rates is not an integer, said ratio being defined by a fraction having a numerator and a divisor, said system comprising:

a. a transmitter including partitioning means for partitioning the incoming data into frames of bits equal to said numerator, each frame being further partitioned into words of unequal bits the number of words per frame being equal to said divisor, a plurality of transmit remainder calculating means for generating transmit remainders corresponding to said words based on a preselected modulus, said preselected modulus being denominated as m, and encoding means for encoding said transmit remainders into bauds for transmission on a data channel; and b. data receiving means for receiving said bauds from said data channel and including decoding means for decoding said bauds into receive remainders, and a plurality of receive remainder circuits for converting said receive remainders into received data using a modulus m conversion.

7. The system of claim 6 wherein said encoding means includes a quadrature amplitude modulation encoder.

8. The system of claim 6 wherein said data decoding means includes a quadrative amplitude modulation decoder.

9. The system of claim 7 wherein said encoding means transmits bauds defined by a preselected number of signal points on a signal constellation, and wherein said modulus m is equal the number of signal points.

10. The system of claim 9 wherein said fraction is c and said modulus is approximately equal to $2^c$.

* * * * *